United States Patent
Braghiroli et al.

(10) Patent No.: US 8,169,604 B2
(45) Date of Patent: May 1, 2012

(54) PARAMETER DETECTION SYSTEM

(75) Inventors: Francesco Braghiroli, Reggio Emilia (IT); Paolo Sotgiu, Modena (IT); Marco Tralli, Modena (IT)

(73) Assignee: Snap-On Equipment SRL a Unico Socio, Correggio (RE) (IT)

( * ) Notice: Subject to any disclaimer, the term of this patent is extended or adjusted under 35 U.S.C. 154(b) by 526 days.

(21) Appl. No.: 12/402,069

(22) Filed: Mar. 11, 2009

(65) Prior Publication Data

US 2009/0267784 A1    Oct. 29, 2009

(30) Foreign Application Priority Data

Apr. 24, 2008   (EP) ..................................... 08007932

(51) Int. Cl.
*G01B 11/26* (2006.01)
(52) U.S. Cl. ................... 356/139.09; 356/601; 356/608; 73/146; 73/462
(58) Field of Classification Search .................. 356/139, 356/601–608; 73/146, 462
See application file for complete search history.

(56) References Cited

U.S. PATENT DOCUMENTS

| | | | |
|---|---|---|---|
| 4,957,369 A * | 9/1990 | Antonsson | 356/608 |
| 6,584,378 B1 | 6/2003 | Anfindsen | |
| 6,604,292 B1 | 8/2003 | Irish et al. | |
| 7,199,880 B2 * | 4/2007 | Braghiroli | 356/601 |
| 7,269,997 B2 | 9/2007 | Dale, Jr. et al. | |
| 2004/0051864 A1 * | 3/2004 | Braghiroli | 356/139.09 |
| 2005/0055153 A1 * | 3/2005 | Braghiroli | 701/124 |
| 2005/0058333 A1 * | 3/2005 | Kaneko et al. | 382/141 |
| 2005/0268707 A1 | 12/2005 | Dale, Jr. et al. | |
| 2006/0265177 A1 | 11/2006 | Steinbichler et al. | |
| 2007/0124949 A1 | 6/2007 | Burns, Jr. et al. | |

FOREIGN PATENT DOCUMENTS

| | | |
|---|---|---|
| DE | 199 21 650 A1 | 11/2000 |
| EP | 1 840 550 A1 | 10/2007 |

OTHER PUBLICATIONS

Extended European Search Report issued in European Patent Application No. EP 08007932.0-2213, dated Oct. 30, 2008.

* cited by examiner

*Primary Examiner* — Tarifur Chowdhury
*Assistant Examiner* — Isiaka Akanbi
(74) *Attorney, Agent, or Firm* — McDermott Will & Emery LLP (57) ABSTRACT

The present invention refers to a parameter detection system for detecting in a non-mechanical manner at least one parameter of an object (1) to be examined. The parameter detection system includes a mounting device (2) for holding the object, and a mobile unit (14) which is freely movable and adapted for indicating a position on the object. A sensing means is provided for sensing the position on the object indicated by the mobile unit and for outputting corresponding detection signals indicative of the sensed position. A calculation means (13) is provided for calculating the at least one parameter from the position on object based on the detection signals.

13 Claims, 5 Drawing Sheets

PARAMETER DETECTION SYSTEM

The present invention relates to a parameter detection system, and in particular to a parameter detection system for detecting a parameter of an object to be tested or treated indicative of the properties of this object in a non-mechanical manner on the basis of sensor signals, and outputting the detection result for further data evaluation.

Prior art document U.S. Pat. No. 7,269,997 B2 discloses a non-contact method of and a system for tire analysis, wherein geometrical parameters of the tire are analyzed. Specifically, an emitter source is provided for emitting radiation signals towards the tire. On the basis of reflected signals picked-up by a corresponding detector a data processing system determines a surface profile showing respective heights or depths of the surface of the tire. Based on the surface profile presented on a display means the operator can obtain information about the condition of the tire and the wear thereof.

Furthermore, prior art document EP 1 840 550 A1 discloses a method of and an apparatus for balancing vehicle wheels, basically including a rim and a tire, wherein a test run of a vehicle wheel assembly is carried out and a degree of imbalance of the vehicle wheel assembly is determined. As a result of the test run and subsequent data evaluation a balancing position of a rim is determined. An application part can be used by an operator for freely moving the application part to the predetermined balancing position of the rim, and when the application part is moved to the balancing position on the rim, the balance weight can be applied to the correct position. The movements of the application part are detected in a non-contact manner by an inertial guidance. This corresponds to a tracking of the moving conditions of the application part when handled by the operator Accordingly, in view of the above prior art, it is an object of the present invention to provide a non-mechanical parameter detection system for detecting the parameter of an object to be examined which is easy to operate and which ensures reliable detection results.

According to the present invention, this object is accomplished by a parameter detection system for detecting in a non-mechanical manner at least one parameter of an object as set out in the appended claims.

The parameter detection system according to the present invention for detecting in a non-mechanical manner at least one parameter of an object to be examined, includes a mounting device adapted for holding the object, a mobile unit adapted for indicating a position on the object, sensing means adapted for sensing the position on the object indicated by the mobile unit and outputting corresponding detection signals indicative of the position, and calculation means adapted for calculating the at least one parameter from the position on the object based on the detection signals.

The object to be examined may be a wheel assembly including at least a rim and a tire, and the mounting device may be a wheel balancing apparatus or a tyre changer.

The at least one parameter of the object may be calculated relative to a reference point or a reference plane related to the object.

According to a first aspect of the present invention, the mobile unit may include an illumination means for illuminating the predetermined position on the object, and the sensor means may include at least two image pickup means for picking-up images of the illuminated position on the object. Moreover, the at least two image pickup means preferably supply the picked-up images of the illuminated position on the object to the calculation means connected thereto to calculated from the images the spatial coordinates of the predetermined position on the object from which the at least one parameter is calculated. The at least two image pickup means preferably form a stereo pair of cameras.

The illumination means may includes at least one of a laser means or an LED-based illumination means.

The mobile unit may be a handheld device and may be freely movable within a predetermined working space related to the object.

The mobile unit may comprise a switching means for instructing the calculation means to perform calculations of the at least one parameter of the object based on the actual position indicated by the mobile unit.

According to second aspect of the present invention the sensor means may include a plurality of receivers for receiving signals emitted from the mobile unit, and the signals emitted by the mobile unit may include at least one of ultrasonic signals or radio frequency signals.

The receivers are preferably provided for generating detection signals based on the received signals, and for supplying the detection signals to the calculation means connected to the plurality of receivers to calculate from the detection signals the spatial coordinates of the predetermined position on the object from which the at least one parameter is calculated.

The system may further comprise a reference position to which the mobile unit can be placed to perform calibration or presetting of the system.

The system may preferably include at least three receivers each located at a predetermined position, and wherein the at least one parameter related to the object is detected by time-of-flight trilateration.

According to a third aspect of the present invention, the sensor means of the system may be arranged in the mobile unit and may include at least two sensors for continuously sensing a linear and an angular orientation of the mobile unit which may be freely movable in all degrees of freedom. The system may further have a reference position to which the mobile unit can be placed to perform a calibration and presetting of the at least two sensors.

BRIEF DESCRIPTION OF THE DRAWINGS

These and other aspects of the invention will become apparent from and elucidated with reference to the embodiments described hereinafter. In the following drawings

DETAILED DESCRIPTION OF PREFERRED EMBODIMENTS

First Embodiment

Hereinafter the structure and operation of the parameter detection system according to the present invention is described in detail on the basis of embodiments in conjunction with the FIGS. 1 and 2.

Figure 1:
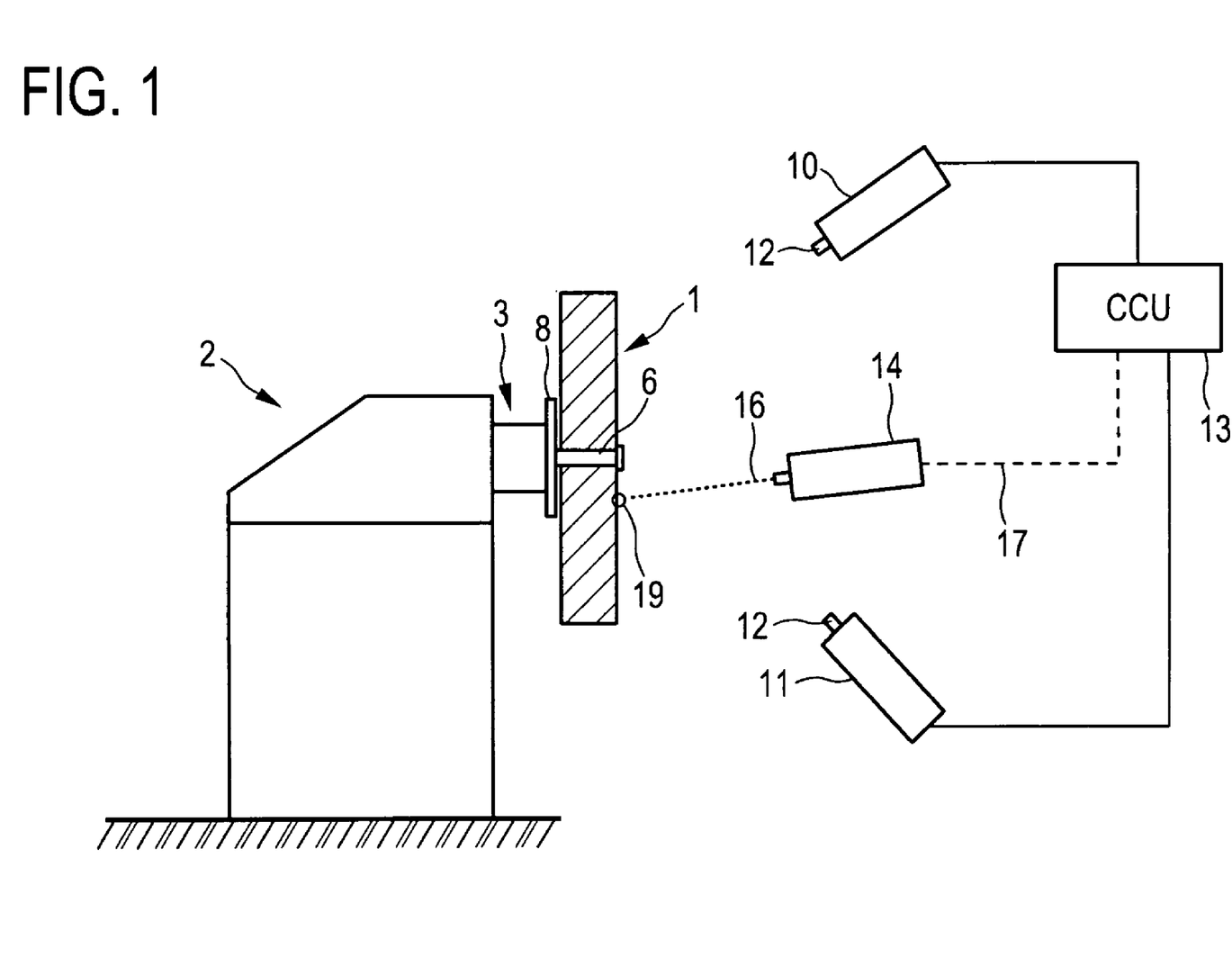
FIG. 1 shows a schematic overall view of the parameter detection system according to a first embodiment of the present invention.

According to the representation of FIG. 1 showing details of the parameter detection system of the present invention, an object which is mounted to a mounting device 2 by means of a mounting mechanism 3 forms the object under testing. The object according to FIG. 1 is preferably a vehicle wheel assembly 1 (in the following named wheel assembly) comprising a rim 4 of the vehicle as well as a tire 5 arranged on the rim 4. The rim 4 of the wheel assembly 1 having the tire 5 arranged thereon is mounted to the mounting mechanism 3 of the mounting device 2, which may preferably be a wheel balancing apparatus or a tyre changer. The wheel assembly 1 is fixed in a known manner to a shaft 6 which forms part of the mounting mechanism 3. The object in the form of the wheel assembly 1 is, thus, fixed to the mounting mechanism 3 of the mounting device 2 (wheel balancing apparatus or a tyre changer) and is rotatably supported about an axis of rotation (wheel axis 7) defined by the shaft 6. When the wheel assembly 1 is clamped in a centered position the shaft 6 coincides with the wheel axis 7 (axis of the wheel assembly 1), and this arrangement ensures that the wheel axis 7 is stationary when the wheel assembly is mounted to the mounting device 2 and can only perform a rotational movement.

The wheel assembly 1 being in the centered position is mounted in conjunction with a coupling plate 8 which can define a reference position and in particular a reference plane 9 for the wheel assembly 1 in conjunction with the wheel axis 7 or the shaft 6. In this case, the reference plane 9 is perpendicular to the wheel axis 7 of the wheel assembly 1 and the extension of the shaft 6 and constitutes the plane in which the wheel assembly 1 rotates when the mounting device 2 (wheel balancing apparatus or tyre changer) is operated. The shaft 6 forms in the balancing apparatus the measuring shaft and in the tyre changer the shaft on which the wheel assembly 1 is fixed for the tyre changing operation.

The parameter detection system according to the present invention further comprises at least a first camera 10 and a second camera 11 which are arranged for picking up images from a particular predetermined side or portion of the wheel assembly 1. Hence, both the first and the second cameras 10 and 11 are directed to the particular side the wheel assembly 1 which is not facing the coupling plate 8 of the mounting mechanism 3. Preferably, both the first and the second cameras 10 and 11 are basically directed to the measuring shaft 6 or the wheel axis 7.

Each of a first and second camera 10 and 11 comprises an optical lens (image pickup lens, objective lens) for forming an object image of the object to be examimined (such as the wheel assembly 1), as well as an image pickup means (not shown) provided in the form of a semiconductor sensor (CCD sensor or CMOS-sensor) for sensing the object image provided by the optical lens. Corresponding output signals are generated and are transmitted to a central control unit 13 (CCU) for further data evaluation. That is, both the first and the second cameras 10 and 11 are connected to the central control unit 13 which has the function of a calculation means. Moreover, the central control unit is adapted to provide a control of each of the first and the second cameras 10 and 11.

Figure 2:
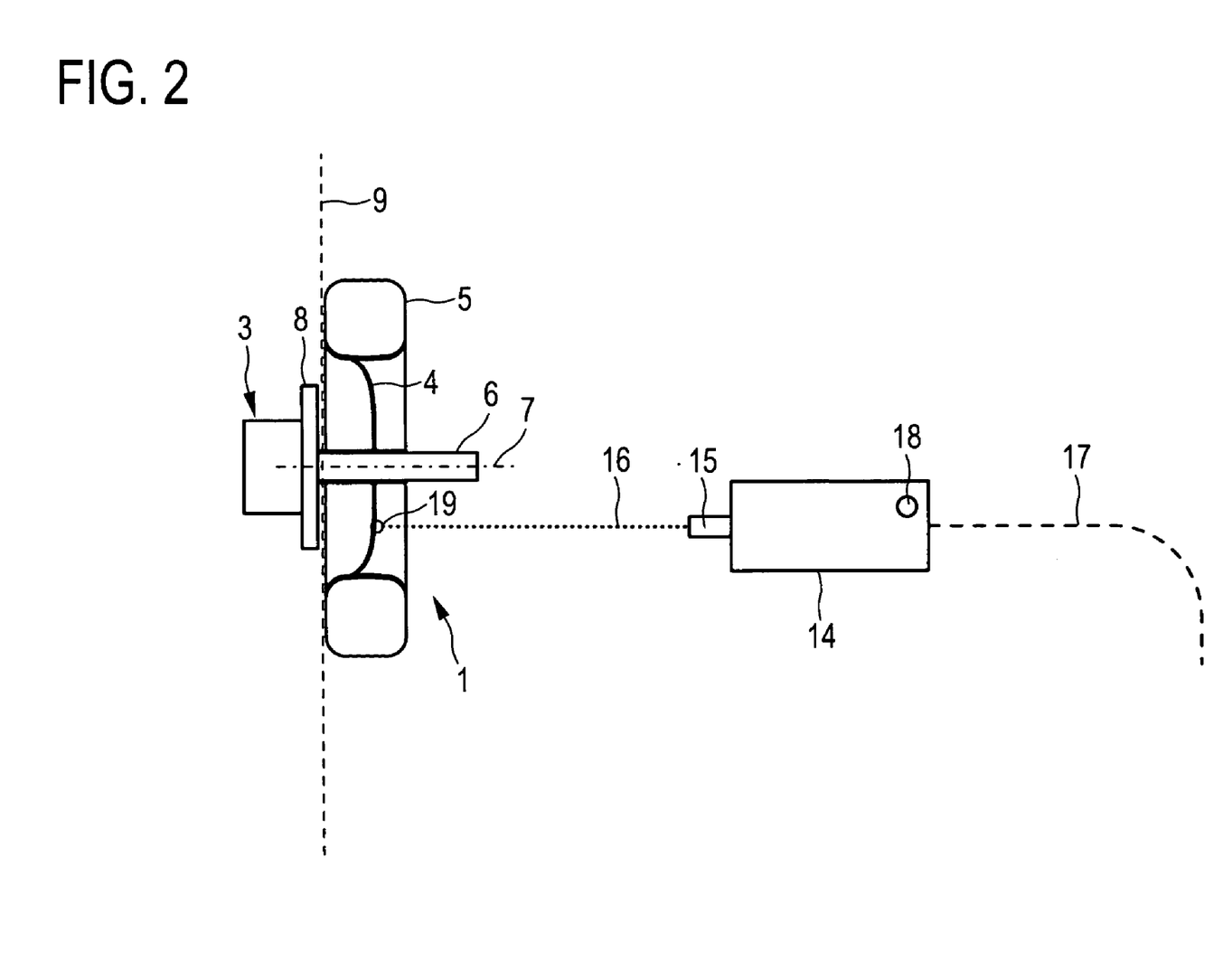
FIG. 2 shows the arrangement of a mobile unit as shown in FIG. 1.

As is shown in FIG. 1 and in more detail in FIG. 2, the parameter detection system according to the present invention comprises a mobile unit 14 which is a movable device and can be freely moved around the mounting device 2 and around the wheel assembly 1 arranged thereon. Accordingly, the mobile unit 14 can be freely moved within a predetermined working space related to the object under examination.

As is shown in FIG. 2, the mobile unit 14 comprises a light emitting means 15 for emitting a light beam 16 into a predetermined direction from the mobile unit 14. The mobile unit 14 is connected to the central control unit 13 for the transmission of data and operation commands. The transmission of data and operation commands is preferably bidirectional. Specifically, the mobile unit 14 can be connected to the central control unit 13 by means of a connection wire 17 (shown in FIG. 1 as a dashed line) which is a flexible cord and allows free movement of the mobile unit 14 when handled by an operator.

The mobile unit 14 according to the present invention is not limited to having a wired connection with the central control unit 13, but can also have a wireless connection based on a radio frequency (RF) communication link. When a radio frequency communication link is preferred, a wired connection is omissible, and the mobile unit 14 further includes a power supply means which may be provided in the form of a battery or an accumulator. The power supply means provides power to all electrical or electronical devices as well as the light emitting means 15 arranged in or at the mobile unit 14.

The mobile unit 14 may further include an operation button 18 for manual operation by the operator or user of the mobile unit 14 for sending instructions to the central control unit 13 in a wired or wireless manner.

The operation of the parameter detection system according to the first embodiment of the present invention and having the structure as described above in detail is now described in the following.

The parameter detection system of the present invention, which can also be described as a non-contact or non-mechanical analytical system, is operated for detecting parameters related to the wheel assembly 1 which is the object to be examined. The parameter detection system facilitates picking-up of the necessary parameters related to the wheel assembly 1 so that properties and characteristic parameters of the wheel assembly 1 can be input to the central control unit 13 for further data evaluation. In particular, the kind of vehicle wheel, that is, the kind of rim 4 and tire 5 of the wheel assembly 1 can be determined based on the detected parameters peculiar to the wheel assembly 1 under examination. The parameter detection system of the present invention therefore also functions as a parameter input device.

Both the first and the second cameras 10 and 11 which have the function of a sensing means adapted for sensing a position on the object (wheel assembly 1) to be examined, are basically arranged according to the schematic representation of FIG. 1. The first and the second cameras 10 and 11 are calibrated, that is, are adjusted and aligned to aim at the wheel assembly 1 and specifically to the rim 4 or the tire 5 thereof. When the pair of cameras (first and second cameras 10 and 11) are properly set and calibrated, it is possible to pick up images of the wheel assembly 1, and specifically of a predetermined portion of interest thereof. The pictures picked-up by each of the cameras 10 and 11 are input to the central control unit 13 and can be subject to any predetermined data evaluation such as, for example, a data comparison process or a data matching process to obtain a corresponding detection result.

According to the present invention, for obtaining the desired detection result, the operator can use the mobile unit 14 which is a handheld and freely movable device and which is able to emit a light beam to a direction defined by the user or operator.

In this connection, the light emitting means 15 may be a light emitting diode LED with a integrated condenser lens (not shown) for emitting a small and precisely focused light beam. Preferably, the light emitting means 15 is provided in the form of a semiconductor laser, and the light beam 16 is preferably a laser light beam which causes, when the mobile unit 14 is directed to the wheel assembly 1, a well-focused and easily identifiable beam spot 19 (illuminated position) at a predetermined position on the wheel assembly I desired or intended by the user or operator when handling the mobile unit 14. If a diffused emitting means 15, i.e. one diffused emitter on an array of diffused emitters in form of LEO, the emitting means 15 is placed closely to the position of interest.

Hence, for identifying or indicating (marking) a particular and desired position on the wheel assembly 1 the user directs the mobile unit 14 including the light emitting means 15 to the wheel assembly 1 and creates the beam spot 19 at the predetermined position on the wheel assembly 1. The beam spot 19 on the wheel assembly 1 at any arbitrary position and indicative of the position of interest is picked-up as a corresponding image by both the first and the second cameras 10 and 11, and both images are subject to a predetermined data evaluation in the central-control unit 13. Based on the signals transmitted to the central control unit 13 and as a result of the data evaluation (which may preferably be a correlated data evaluation and/or calculation) an exact spatial position of the beam spot 19 can be determined.

To instruct the parameter detection system according to the present invention, that a particular beam spot 19 selected or created by the user represents the predetermined position on the wheel assembly 1 of interest, the user can use or press the operation button 18 on the mobile unit 14 to give an instruction to the central control unit 13 regarding the present beam spot 19.

When the parameter detection system of the present invention is instructed to define a particular position on the wheel assembly 1 corresponding to the selected beam spot 19, such data are stored in the central control unit 13, the data representing that at least one parameter related to the wheel assembly 1 and measured by the parameter detection system according to the present invention.

When the pair of cameras 10 and 11 is properly calibrated, it is possible to exactly reconstruct the 3D world coordinates of the predetermined position (beam spot 19) on the wheel assembly 1 (created by the light emitting means 15 of the mobile unit 14 and as seen by both cameras 10 and 11) by means of projective transformation. Since the calibration of both cameras 10 and 11, which may constitute a stereo system, is basically a calibration of the relationship between the two camera sensors (semiconductor image pickup means), the predetermined position detected by this arrangement, that is, the position of the beam spot 19 on the wheel assembly 1 is free. In this case, "free" means a free and independent movement of the mobile unit 14 within the predetermined working space around the wheel assembly 1 and the projection of a beam spot 19 on any arbitrary position on the wheel assembly 1, provided that the beam spot 19 at the position of interest lies within the image pickup arranged of each of the cameras 10 and 11.

The parameter detection system according to the present invention, therefore, provides the operator with the handheld mobile unit 14 which has preferably a laser light emitter, and the user or operator can use the beam spot 19 on the rim 4 of the wheel assembly 1 to point to the exact position or positions on the rim 4 where the user wants to attach wheel weights for obtaining the necessary wheel balance. The stereo system composed of the first and the second cameras 10 and 11 can measure the real-world coordinates (three-dimensional coordinates) of the indicated positions on the wheel assembly 1 and can use the corresponding detection results output by each of the cameras 10 and 11 for specific calculations, which can also be used for determining the properties and parameters related to the wheel assembly 1. That is, the parameter detection system according to the present invention serves for inputting the parameters in question or of interest.

When the mobile unit 14 is operated by the user, the operation button 18 serves as a confirmation button that the user should press to confirm that the currently pointed or highlighted position (position of the beam spot 19 on the wheel assembly 1) is the required one, i.e. the predetermined position of interest.

The parameter detection system according to the present invention is thus adapted to detect parameters related to the wheel assembly 1 (based on the detection of three-dimensional positions) to determine the properties and characteristics of the rim 4 (and of tire 5) of the wheel assembly 1, as well as to determine the predetermined position where a balance weight for balancing the wheel assembly 1 of the vehicle is to be arranged. The principles are the same in both cases. The detected data and specifically the parameters of interest can be stored in the central control unit 13 and can be displayed on a display means (not shown) connected to the central control unit 13. If the wheel assembly 1 is fixed on the shaft of a tyre changer, the detected parameters can be used to control the movement of the mounting or demounting tool during the tyre changing operation.

The arrangement of the parameter detection system according to the present invention provides an easy handling of the particular means and devices of the parameter detection system so that even less-qualified personal or any layman can operate the parameter detection system of the present invention and can obtain in an easy manner reliable detection results, provided that before use of the parameter detection system the image pickup means in the form of the first and second cameras 10 and 11 are properly adjusted (calibrated).

The parameters detected by the parameter detection system of the present invention can be determined in three-dimensional world coordinates relative to a reference point or the reference plane 9. FIG. 2 shows reference plane 9 as an exemplary reference plane which is preferably perpendicular to the wheel axis 7 of the wheel assembly 1 and the measuring shaft 6. This particular reference plane 9 can be used as it is probably adjusted in conjunction with the coupling plate 8 of the mounting mechanism 3.

The present invention is, however, not limited to the arrangement of the reference plane 9, and any other arbitrary but fixed reference point or reference plane can be used. The detection result of the parameter detection system of the present invention has to be interpreted in conjunction with the selected or calibrated reference point or reference plane.

The present invention is further not limited to the detection of parameters related to a vehicle wheel assembly forming the object of interest, based on the detection of three-dimensional positions. It is possible to perform a corresponding measurement with any arbitrary object mounted at a fixed position and having a more or less irregular surface so that arbitrary positions on the surface of the object can be marked with the beam spot 19 and can be evaluated and, as a final result of the evaluation, be presented as precise parameters related to the object of interest.

That is, the invention can be used for supporting any manufacturing process, and specifically the manufacturing process of tires and rims of a vehicle wheel assembly or any other product.

Second Embodiment

Figure 3:
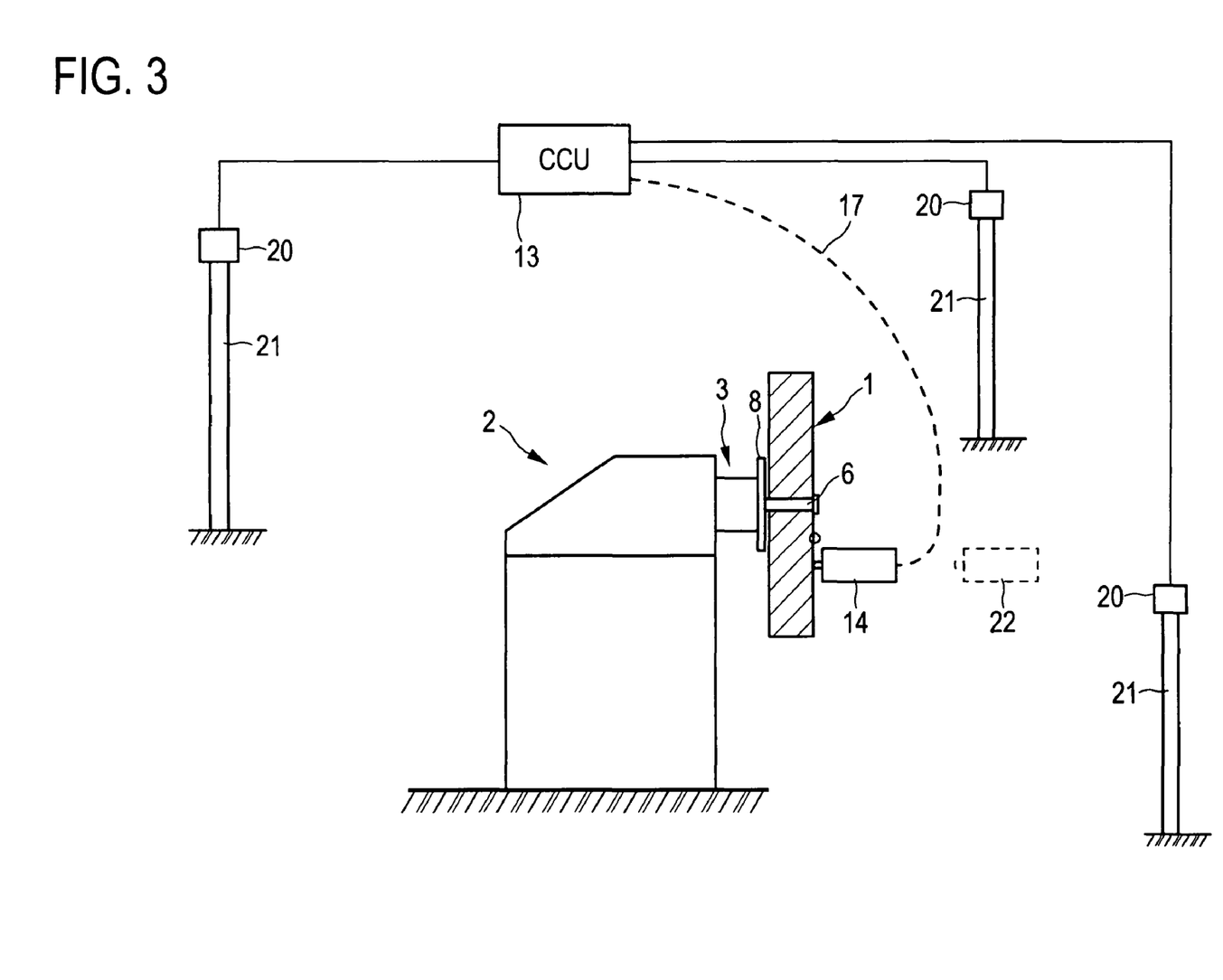
FIG. 3 shows a schematic overall view of the parameter detection system according to a second embodiment of the present invention.

The parameter detection system according to the present invention will be described on the basis of a second embodiment which is shown in FIG. 3.

Regarding the arrangement shown in FIG. 3, it is to be noted that corresponding means and devices shown in FIG. 3 and having the same function as corresponding means and devices in FIG. 1 or FIG. 2 will have the same reference number.

In a similar manner as it is the case in the arrangement of FIG. 1 of to the first embodiment, the parameter detection system according to the second embodiment of the present invention comprises a mounting device 2 to which a wheel assembly (object of interest; vehicle wheel assembly) 1 is mounted. The mounting process of the wheel assembly 1 to the mounting device 2 involves a mounting mechanism 3 which includes a coupling plate 8 to which the wheel assembly 1 is pressed. The wheel assembly 1 is fixedly mounted to the mounting mechanism 3 specifically on a shaft 6, and can be rotated in a plane perpendicular to the shaft 6 which is identical to the wheel axis 7 (see FIG. 2, not shown in FIG. 3) of the wheel assembly 1.

The mounting device 2 is preferably provided in the form of a wheel balancing apparatus for carrying out a wheel balancing process to determine the balancing weight for the wheel assembly 1, as well as the position for applying the balancing weight (not shown) to the wheel assembly 1. The mounting device 2 can also be designed as a tyre changer onto its shaft the wheel assembly 1 is fixed for the tyre changing operation.

For detecting the necessary parameters related to the wheel assembly. 1 as well as the specific position for applying the balancing weight, and for obtaining detailed coordinates of these positions or points of interest, the parameter detection system according to the present invention further comprises a mobile unit 14 which is (similar to the mobile unit 14 of the first embodiment, FIGS. 1 and 2) freely movable in the space around the wheel assembly 1 mounted to the mounting device 2.

The mobile unit 14 according to the second embodiment includes an emitting means (not shown) for emitting in a wireless manner any radiation, which can be sensed and received by corresponding receivers 20. FIG. 3 shows at least three receivers 20 which are arranged on holders 21 to be at the position for undisturbed reception of the radiation (signals) transmitted by the mobile unit 14. The locations of the holders 21 and the receivers 20 are preferably predetermined positions and the receivers 20 have the function of a sensing means.

According to a preferred arrangement the mobile unit 14 may be adapted to emit an ultrasonic sound, and the receivers 20 are provided as ultrasonic transducers.

The present invention is not limited to the use of ultrasonic signals transmitted from the mobile unit 14 to the receivers 20, but any radiation such as radio frequency (RF) can be used as long as the receivers 20 are adapted to the kind of radiation and frequency for undisturbed and untroubled reception of the corresponding signals.

The at least three receivers 20 are connected typically by a wired connection to a central control unit 13 which includes a corresponding program based on a control concept for providing the overall control of the parameter detection system of the present invention according to the second embodiment thereof. The detection signals generated by the plurality of receivers 20 are supplied to the central control unit 13 (calculation means).

In a similar manner as it is the case according to the first embodiment the central control unit 13 performs the data evaluation and provides as a final result the parameters related to the wheel assembly 1 measured by the received signals of the receivers 20.

In order to obtain a measurement result relative to a particular position or point of interest on the wheel assembly 1 mounted to the mounting device 2, it is necessary according to the second embodiment to place the freely movable mobile device 14 to this arbitrary position so that the mobile unit 14 is placed directly adjacent to the position of interest on the wheel assembly 1. When the mobile unit 14 is placed adjacent to the position of interest a confirmation button (not shown in FIG. 3) can be operated by the user and the parameter detection system according to the present invention starts operation and measurement of the parameters of interest by transmitting preferably ultrasonic signals from the mobile unit 14 to the plurality of receivers 20. Based on the received signals spatial coordinates of the position of interest are determined and finally the parameters in conjunction with this position of interest can be calculated. The central control unit 13 may instruct storage and display of the final results to inform the user or operator accordingly.

The mobile unit 14 may also have a wireless or wired connection 17 to the central control unit 13 for in a bidirectional manner communicating signals and instructions to and from the mobile unit 14 from and to the central control unit 13.

The parameter detection system according to the second embodiment of the present invention requires an initial setting (presetting) or calibration, and for obtaining a proper calibration a reference position 22 for disposing the mobile unit 14 is provided. This reference position 22 may constitute a rest position as well as a calibration position. The parameter detection system according the present invention can be controlled by the central control unit 13 to automatically perform calibration and basical setting of the entire system. The basical setting includes the storage of basic parameters related to the wheel assembly 1 (object to be examined) for carrying out a specific data matching operation to determine, for example, the kind of rim or tire. The initial position or rest position 22 is shown in FIG. 3 as a dashed block.

During the calibration process carried out by the central control unit 13 the position of the mobile unit 14 relative to the positions of the plural receivers 20 (which have fix predetermined positions in space) is defined when specifically the mobile unit 14 is placed at the reference position 22 (initial position or rest position). Basic data can then be obtained, and when the mobile unit 14 is moved to any other arbitrary position in space the relative position of the mobile unit 14 to the plural receivers 20 can be determined. The detection and determination of the actual arbitrary position of the mobile unit 14 (spatial position) can be carried out provided that the mobile unit 14 is located within the detection range of the parameter detection system of the present invention. This possible detection range is basically defined by the arrangement of the plural receivers 20. Moreover, the detection and determination of the actual arbitrary position of the mobile unit 14 can be carried out continuously or intermittently, that is, every predetermined period of time.

The operation of the parameter detection system according to the second embodiment is described in the following.

The at least three receivers (transponder) 20 are placed in known positions relative to the mounting device 2 (for example a wheel balancing apparatus) and the position of the mobile unit 14 in the working position (close to the object to be examined) or in the rest position 22. The radiation emitting means in the mobile unit 14 may preferably be an ultrasonic emitter, and the receivers may be ultrasonic transducers. The distance of the mobile unit 14 (including the emitter) from each of the plural receivers 20 will be determined by means of a time-of-flight technique, wherein distance is found by the time it takes for the ultrasonic signals (radiation, ultrasonic pulses) to proceed from the mobile unit 14 to each of the plural receivers 20 and multiplying by the speed of the sound.

In order to perform an accurate time-of-flight distance measurement, synchronisation between the emitter of the mobile unit 14 and each of the at least three receivers 20 is required. This can be achieved by means of a dedicated wire, by means of a light emitter-receiver pair, typically by using infrared light (IR), by means of a radio frequency emitter-receiver pair (RF emitter-receiver pair), or in the manner based on the exchange of ultrasonic pulse signals between the emitter of the (handheld) mobile unit 14 and the plurality of receivers 20. In this way, synchronisation between the emitter of the mobile unit 14 and the plural receivers 20 is achieved by a request-response handshake protocol.

Once the distance of the mobile unit 14, which constitutes a handheld target for the parameter detection system of the present invention, relative to the at least three receivers 20 (the known positions thereof) is determined, the 3D world coordinates of the mobile unit 14 that is, the (x, y, z) positions in three degrees of freedom, can be determined by means of trilateration.

More specifically, a phase-coherence method can be used in theory. This principle uses a signal phase difference to determine a position. Based on the use of ultrasonic signals, since sound travelled by means of a sinusoidal waveform is performed the signal phase angle at a fixed position of the receiver 20 and the mobile unit 14 Will always remain constant. As the receivers 20 relatively move away from the emitter of the mobile unit 14 when the mobile unit 14 is moved, the signal phase angle will change because sound waves need to travel further to get to each of the receivers 20. This change in the signal phase angle can be converted into a change in distance from the mobile unit 14 (emitter, transmitter), since the ultrasonic signal wavelength is known.

However, if the mobile unit 14 the movement and actual position of which is to be tracked moves farther than one-half of the signal wavelength in any direction during the period of one update, errors will result in the position determination. This is because the signal waveform repeats itself after each wavelength, and any change between updates in position of one-half of wavelength would be difficult for the computer to determine whether the mobile unit 14 (emitter, transmitter) moved towards or away from the receivers, as both positions would yield the same phase angle. Since phase-coherent tracking is an incremental form of position determination, small errors in position determination will result in large errors overtime (drift errors).

In principle, without departing from the concept of the parameter detection system of the present invention (second embodiment), light or radio frequency (RF) can be used for performing the parameter measurement process and as a time-of-flight medium, but the speed of light is involved in this case, instead of the speed of sound.

The use of the ultrasonic trilateration is immune to electrical and magnetic interference. Electrical and magnetic fields do not affect ultrasonic sound waves, therefore, the environment does not need to be free of electrical cables, monitors, computers, and ferrous metal fixtures.

Moreover, as a further advantage, tracking of the mobile unit and, thus, of a position where the mobile unit 14 is actually located, is not affected by any nearby objects. Ultrasonic sound waves do not change their properties or waveform when other objects are in the vicinity of the tracked mobile unit 14.

The mobile unit 14 is preferably a light weight unit including the emitter or transmitter and can easily be carried or held by a person (such as an operator). The performance of the parameter detection system of the second embodiment can be maintained due to the easy handling and save operation, even when less-qualified staff operates the system.

The initial position or rest position 22 of the mobile unit which serves for calibration, is schematically shown in FIG. 3 at a predetermined location (dashed block). The present invention is however not restricted to this arrangement or positioning of the mobile unit 14, but any position can constitute the rest position for the mobile unit 14 for calibration, provided that it completely lies within the general detection range of the system.

Third Embodiment

Figure 4:
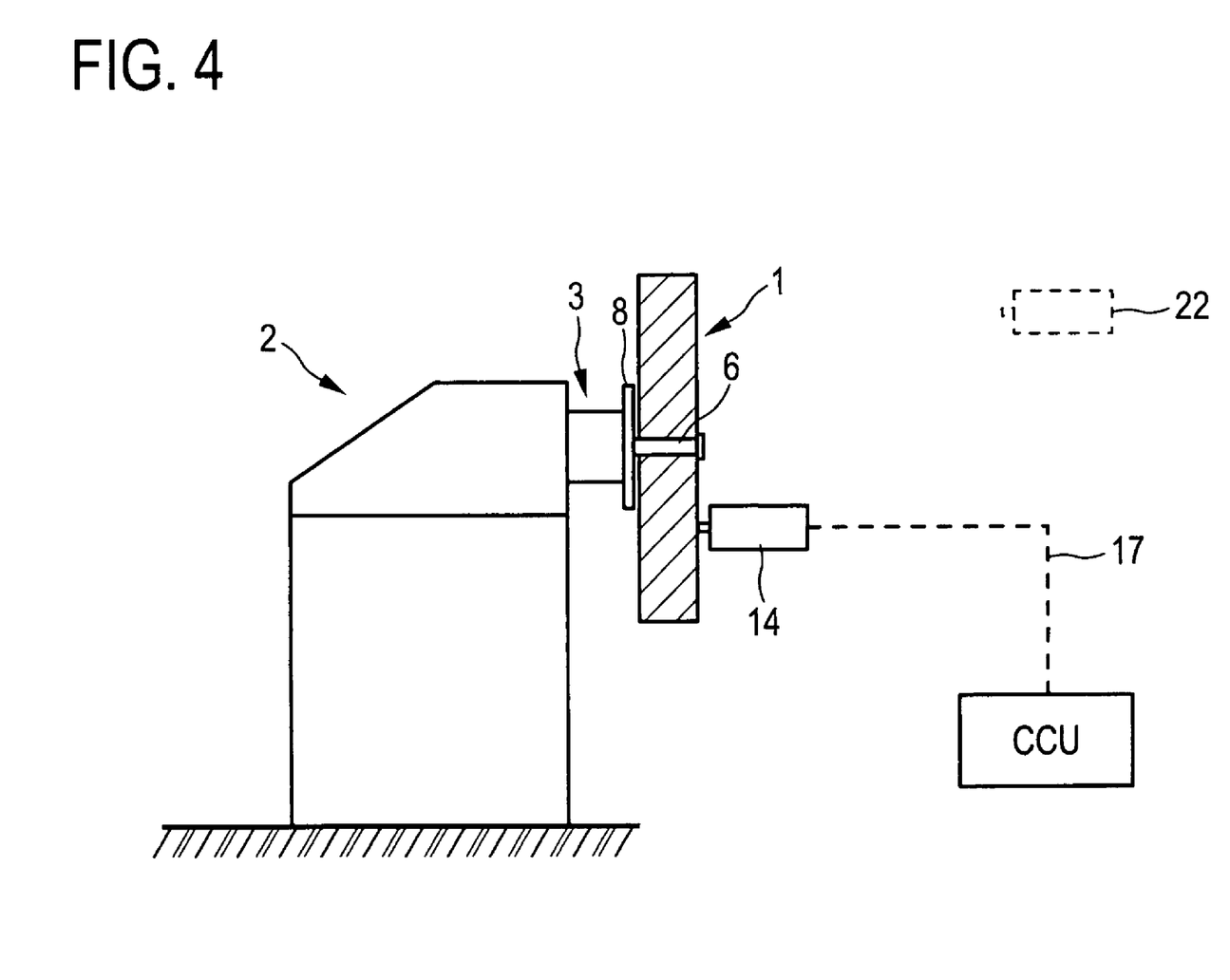
FIG. 4 shows a schematic overall view of the parameter detection system according to a third embodiment of the present invention.
Figure 5:
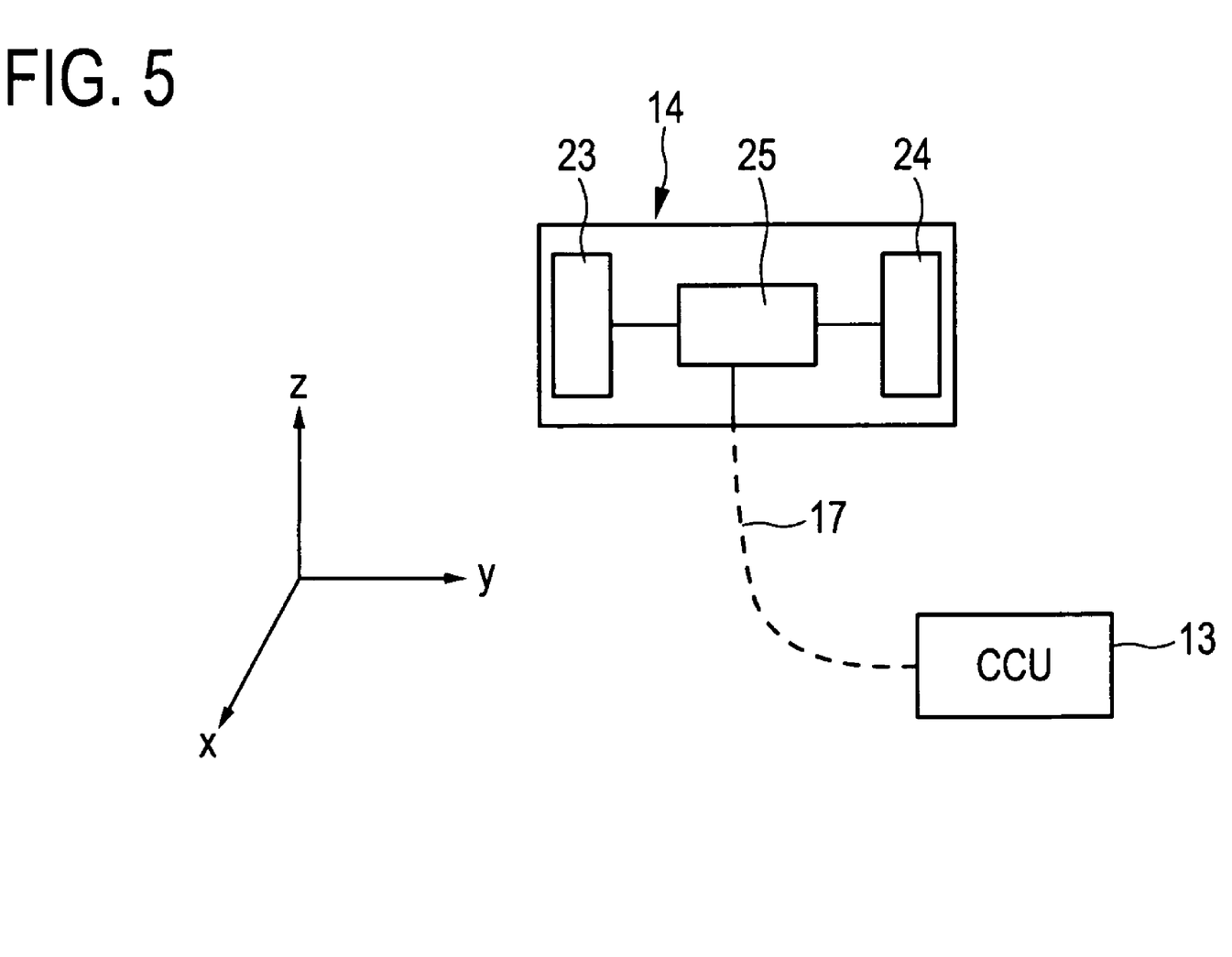
FIG. 5 shows the structure of a mobile unit as shown in FIG. 4.

With reference to FIGS. 4 and 5 a third embodiment of the parameter detection system according to the present invention is described.

In correspondence to the arrangement shown in FIGS. 1 to 3 according to the first and second embodiments of the present invention, identical or corresponding parts of the parameter detection system of the third embodiment basically having the same structure and/or function of one of the previously described embodiments are assigned the same reference number, and a more detailed explanation is omitted.

According to the arrangement shown in FIG. 4, an object to be examined is provided in the form of a wheel assembly 1 (vehicle wheel assembly) which is mounted to a mounting device 2 by means of a mounting mechanism 3. The wheel assembly 1 is specifically positioned on a shaft 6 and is urged against a coupling plate 8 forming part of the mounting mechanism 3, by a specific lock means (not shown) to obtain the desired fixed position on the mounting device 2. The wheel assembly 1 forming the object to be examined is fixedly mounted in view of its position and can only be rotated around the axis of the wheel assembly 1 (wheel axis 7 which is identical to the extension of the shaft 6). The shaft 6 can be the measuring shaft of a balancing apparatus or the shaft of the rotation device of a tyre changer.

The parameter detection system according to the third embodiment further comprises a mobile unit 14 which is like in the first and second embodiments freely movable within an allowable working space around the mounting device 2 where the wheel assembly 1 of a vehicle is under examination. Specifically, parameters and further properties of the wheel assembly 1 are of interest and are to be detected.

As described in conjunction with the previous embodiments the wheel assembly 1 consists of a rim 4 and a tire 5. This is not shown in FIGS. 4 and 5, and it is referred to the details shown in FIG. 2.

The mobile unit 14 which can be moved freely within the working space around the mounting device 2 has an initial position or a reference position 22 (which may also be a rest position) as shown in FIG. 4 by means of a dashed block. The reference position 22 is a predetermined and a known position which serves for calibration and presetting of the position detection process to be performed according to the parameter detection system of the present invention. That is, after calibration of the position of the mobile unit 14 being placed to this end at the reference position 22, the mobile unit 14 is moved to any position on or at the object to be examined, preferably in the form of the wheel assembly 1, and the detected position of the mobile unit 14 placed at the wheel assembly 1 provides the basis for the detection of this particular position on or at the wheel assembly 1. Based on the particular position on the wheel assembly 1 as detected in conjunction with spatial coordinates, at least one parameter of the wheel assembly 1 (parameters related to size, shape and further properties of the wheel assembly 1) can be derived there from. This performance or function corresponds to the performance or function of the parameter detection system of the first and second embodiments of the present invention.

The mobile unit 14 is connected to a central control unit 13 which has the function of a calculation means and serves for an overall control of the parameter detection system of the present invention, including the storage and performance of corresponding control and data evaluation software, handling and storing data, receiving and transmitting data and instructions to and from the mobile unit 14.

The connection between the mobile unit 14 and the central control unit 13 may be a flexible wire such as, for example, a multi-conductor wire, or may be provided in the form of a wireless data communication link based, for example, on a radio frequency (RF) data communication link.

Regarding the representation of FIG. 5, there are shown further details of the mobile unit 14 connected in a wired or wireless manner to the central control unit 13. The mobile unit 14 is a handheld device to be manually positioned by an operator.

More specifically, according to FIG. 5, the mobile unit 14 includes at least a first sensor means 23 and at least a second sensor means 24 which are arranged in the mobile unit 14 and are connected to a controller 25 for driving the at least first and second sensor means 23 and 24 and for inputting detection signals of these sensor means 23 and 24. The controller 25 of the mobile unit 14 is further adapted for respectively transmitting in a wired or wireless manner by means of a wire 17 or a wireless data communication link (including transmitters and receivers) the detection signals for further detailed data evaluation to the central control unit 13.

The at least first and second sensor means 23 and 24 are arranged to detect any movement of the mobile unit 14 such as a linear movement or any rotational movement or any combination thereof in all directions x, y and z (three axes), so that the position and orientation of the mobile unit 14 can be determined according to the 6 degrees of freedom. That is, at least first and second sensor means 23 and 24 are provided for sensing a linear and an angular orientation of said mobile unit 14 which is freely movable in all degrees of freedom in the predetermined working space around the object to be examined.

The operation and function of the parameter detection system according to the third embodiment is described in the following.

The at least first and second sensor means 23 and 24 are preferably provided in the form of accelerometers to measure the linear and angular orientation rates, such as movement of the mobile unit 14 in a linear or curved manner. Regarding the principles of operation behind the accelerometers, it is necessary in order to measure the acceleration along the three axes of the mobile unit 14 (object to be tracked) simultaneously, to have three accelerometer movements, each arranged perpendicular to one of the axes. Integrated circuit technology has advanced to the point where these sensor means are small enough to be used in position tracking, i.e. in detection of the actual position of the mobile unit 14 including such sensor means; Sensors are available as of off-the-shelf parts for measuring In the three axes configured as a single package, usually based on MEMS technology (micro-electro-mechanical system).

In more detail, the output signals of a linear accelerometer need to be integrated twice to derive an actual position. Integration causes the actual positions and orientations to be sensitive to drift, and it is necessary to re-calibrate the parameter detection system periodically. This can be done at any time when the mobile unit 14 is placed at the reference position 22 as shown in FIG. 4. The reference position 22 may form an initial position (or rest position) relative to which the position during an actual movement of the mobile unit 14 is detected or measured. The reference position 22 therefore allows presetting and calibration of the at least first and second sensors means 23 and 24. When the mobile unit 14 is placed close to an arbitrary selected position at the object to be examined, for example in the form of the wheel assembly 1 mounted to the mounting device 2, the coordinates of this position on the wheel assembly 1 can exactly be detected.

In general, in order to determine the orientation in space according to the 6 degrees of freedom, a pair of three-axes accelerometers is required.

The parameter detection system according to the third embodiment of the present invention provides the following advantages.

In particular, the parameter detection system of the present invention detects parameters related to the wheel assembly 1 which is the object to be examined, and when the parameters are detected and are thereby input to the system, the further operation of, for example, a wheel balancing apparatus or of a tyre changer can be controlled on the basis of the detected parameters. These parameters may relate to the shape, size and further properties of a rim or a tire of the wheel assembly 1.

Hence, the parameter detection system of the present invention also serves as a data input means which can be operated in a semi-automatic manner.

The parameter detection system according to the third embodiment needs no emitting means for emitting any signals, such as ultrasonic signals, and no corresponding receivers. The lack of an artificial radiation source means that the inertial tracking mode does not suffer from any signal (noise) or metallic object interference or shadowing. The mobile unit 14 can be moved around without limitation (within the allowable detection range), and when transmitting of detected data (tracking data) can be carried out in a wireless manner, a communication cable (connection wire 17) can be omitted. The user handling the mobile unit 14 is free to move the mobile unit 14 around in the real world with no restrictions. Furthermore, the use of advanced micro-machine inertial sensors as the at least first and second sensor means 23 and 24 and application specific integration circuits can further minimize dimensions (size), costs and weight of the mobile unit 14.

Application of the parameter detection system according to the third embodiment can be used in a large working volume or workspace since it does not need any emitter for emitting any radiation to perform the tracking of the movement (position) of the mobile unit 14, and no hardware or cabling is required When a wireless data communication link between the mobile unit 14 and the central control unit 13 is preferred.

Furthermore, the parameter detection system as described above involves low latency, as the position detection based on inertial navigation by means of accelerators is able to derive positional and orientation changes instantaneously by performing integration and double integration directly on the output signals of the linear accelerometers, thereby performing an immediate reaction and a reliable monitoring of the actual position of the mobile unit 14. The position can be detected reliably so that the position at the wheel assembly 1 can easily and reliably be detected within a short period of time.

Moreover, as in the case of the parameter detection system according to the first and second embodiments, the system provides an easy handling and operation so that even less-qualified personal can obtain reliable detection results very quickly.

Fourth Embodiment

Furthermore, the parameter detection system according to the present invention is now described in conjunction with a fourth embodiment thereof.

The fourth embodiment of the present invention referring to a parameter detection system involves at least two of the parameter detection systems described previously in the form of a first, a second and a third embodiment thereof. When at least two of the above-described technologies of the parameter detection system are combined, this may increase costs and technical effort, but may provide, if required, a further increase in precision and flexibility.

That is, in case the parameter detection system according to the first or second embodiments is combined with the technology described in conjunction with the third embodiment, the precision can be increased, and also the working range (allowable space) for operating the parameter detection system can be increased. This is relevant in case the parameter detection system according to the present invention is applied not only to a wheel balancing apparatus or tire changer and a wheel assembly mounted thereon, which requires a certain working space, but is applied to the general detection of regular or irregular shapes of any product the dimensions of which are to be monitored and input for data evaluation or tested.

The combination of, for example, the parameter detection system according to the first and third embodiments exhibits an increased working space since the working space of the parameter detection system of the third embodiment is only limited by the wireless transmission capability of data between the mobile unit 14 and the central control unit 13 when a wireless data communication link is preferred.

Depending upon the requirements, also the parameter detection system of the first and second embodiments can be combined, so that the smaller but precise working space according to the first embodiment can be increased to a certain extent when the mobile unit 14 includes an emitting means for emitting any radiation, such as ultrasonic signals.

When any combination of the above-described embodiments of the parameter detection system of the present invention is created, the respective advantages are also available for the corresponding combination.

Furthermore, when a combination of at least two of the above-described embodiments of the parameter detection system is used, particular drawbacks of one of the systems can be reduced.

Furthermore, the parameter detection system according to the present invention involves defining (according to the second and third embodiments) that the position to be detected is relative to, for example, a front end of the mobile unit 14 which is positioned as close as possible to the position of interest on or at the wheel assembly 1.

While the present invention has been illustrated and described in detail in the drawings and the foregoing description, such illustrations and descriptions are to be considered illustrative or exemplary and not restrictive. The present invention is not limited to the disclosed embodiments and arrangements shown schematically in the figures, and the reference numbers shown in the drawings and referred to in the description do not limit the scope of the present invention.

Other variations to the disclosed embodiments can be understood and effected by those skilled in the art in practising the claimed invention from a study of the drawings, the disclosure and the appended claims.

The invention claimed is:

1. Parameter detection system for detecting in a non-mechanical manner at least one parameter of an object (1) to be examined or treated, comprising:
    a mounting device (2) adapted for holding said object (1),
    a mobile unit (14) adapted for indicating a position on said object,
    sensing means (10, 11; 14, 20; 23, 24, 25) adapted for sensing said position on said object (1) indicated by said mobile unit (14) and outputting corresponding detection signals indicative of said position, and
    calculation means (13) adapted for calculating said at least one parameter from said position on said object (1) based on said detection signals;
    wherein said mobile unit (14) is a handheld device and is freely movable within a predetermined working space related to said object (1);
    wherein said signals emitted by said mobile unit (14) include at least one of ultrasonic signals or radio frequency signals;
    wherein said sensor means includes at least three receivers (20) for receiving signals emitted from said mobile unit (14), each located at a predetermined position; and
    wherein said at least one parameter related to said object (1) is detected by time-of-flight trilateration.

2. The system according to claim 1, wherein said object (1) is a wheel assembly including at least a rim (4) and a tire (5), and the mounting device (2) is a wheel balancing apparatus or a tire changer.

3. The system according to claim 1, wherein said at least one parameter of said object (1) is calculated relative to a reference point or a reference plane (9) related to said object.

4. The system according to claim 1, wherein said mobile unit (14) includes an illumination means (15) for illuminating said predetermined position (19) on said object (1), and said sensor means include at least two image pickup means (10, 11) for picking-up images of said illuminated position (19) on said object.

5. The system according to claim 4, wherein said at least two image pickup means (10, 11) supply the picked-up images of said illuminated position on said object (1) to said calculation means (13) connected thereto to calculate from said images the spatial coordinates of said predetermined position (19) on said object (1) from which said at least one parameter is calculated.

6. The system according to claim 4, wherein said at least two image pickup means (10, 11) form a stereo pair of cameras.

7. The system according to one of claims 4 to 6, wherein said illumination means (15) includes at least one of a laser means or an LED-based illumination means.

8. The system according to one of claims 1 to 6, wherein said mobile unit (14) comprises a switching means (18) for instructing said calculation means (13) to perform calculations of said at least one parameter of the object (1) based on the actual position indicated by said mobile unit (14).

9. The system according to claim 1, wherein said receivers (20) are adapted for generating detection signals based on said received signals, and for supplying said detection signals to said calculation means (13) connected to said plurality of receivers (20) to calculate from said detection signals the spatial coordinates of said predetermined position on said object (1) from which said at least one parameter is calculated.

10. The system according to claim 1, further comprising a reference position (22) to which the mobile unit (14) can be placed to perform calibration or presetting of the system.

11. The system according to one of claims 1 to 3, wherein said sensor means (23, 24, 25) are arranged in said mobile unit (14) and include at least two sensors (23, 24) for continuously sensing a linear and an angular orientation of said mobile unit (14) which is freely movable in all degrees of freedom.

12. The system according to claim 11, further comprising a reference position (22) to which said mobile unit (14) can be placed to perform a calibration and presetting of said at least two sensors (23, 24).

13. The system according to claim 1 or 2, wherein the mounting device (2) comprises a shaft (6) onto which the wheel assembly is to be fixed.

* * * * *